J. H. Jones,
Horse Power.
N° 22,079.  Patented Nov. 16, 1858.
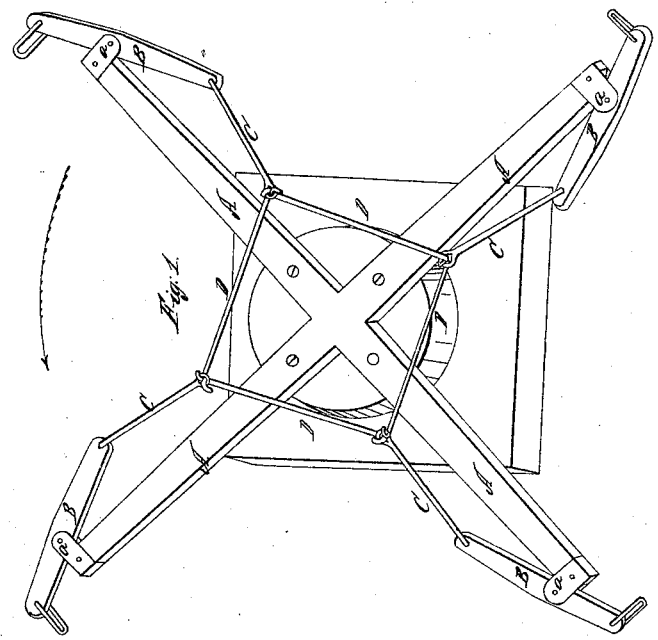
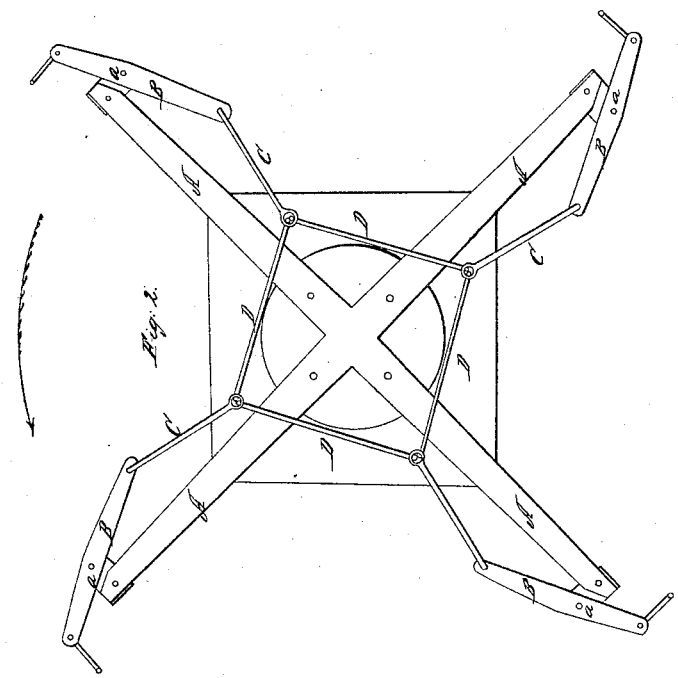

UNITED STATES PATENT OFFICE.

J. H. JONES, OF ROCKTON, ILLINOIS.

HORSE-POWER DRAFT.

Specification of Letters Patent No. 22,079, dated November 16, 1858.

*To all whom it may concern:*

Be it known that I, J. HERVA JONES, of the town of Rockton, in the county of Winnebago and State of Illinois, have invented a new and useful Mode of Equalizing the Draft of Teams Upon Horse-Powers Where Sweeps Are Used; and I do hereby declare that the following is a clear, full, and exact description of the construction and operation of the same, reference being had to the annexed drawings, making a part of this specification, in which—

Figure 1 is a perspective view, and Fig. 2 is a transverse section; the same letters referring to the same parts in both.

The nature of my invention consists in providing the sweeps —A—A—A—A— of horse-powers with levers —B—B—B—B—, whether straight or otherwise, so attached to them by fulcra —a—a—a—a— that when the draft of the teams is applied to the levers, at, or nearly at right angles to them, or to the sweeps, the inner ends of the levers shall by means of the rods C—C—C—C— or any other connection, produce a movement to and from the center of the horse-power. When the sweeps are in their places for operation a flexible link D—D—D—D— is placed upon or beneath them, immediately around the center of the horse-power, and connected at its several corners to the inner ends of the rods C—C—C—C. This link may consist of three, four or more sides according to the number of sweeps used. All the parts thus become a whole, and act with and upon each other.

The advantages of my invention are—equalization of draft—docility of teams—steady motion—little breakage—and economy of power, &c.

The full operation is as follows: The horse-power being in motion; should a team through any cause, start suddenly and forcibly forward, the lever —B— to which they are attached is turned upon its fulcrum —a—, the rod —C—, connected with it is drawn outward from the center; the corner of the flexible link —D—D—D—D, follows—contracting and drawing the whole link toward the team which is in advance. This causes the other three rods C—C—C— to draw toward the center—acting upon the inner ends of the levers —B—B—B, through them drawing the three teams backward and thus softening and adjusting the strain. Should a team on the other hand, slacken its relative pace; the rod —C— is allowed to be drawn inward; the link is expanded, the other teams through their levers and rods take up the slack and thus keep up a uniform motion.

This being the nature and operation what I claim as my invention and desire to secure by Letters-Patent is—

The combination of the levers B—B—B—B— and the flexible link D—D—D—D— in the manner and for the purpose set forth.

J. HERVA JONES.

Witnesses:
G. H. HOLLESTON,
W. R. WELD.